United States Patent
Murayama et al.

(10) Patent No.: US 11,794,752 B2
(45) Date of Patent: Oct. 24, 2023

(54) RECOMMENDATION PRESENTING SYSTEM, RECOMMENDATION PRESENTING METHOD, AND RECOMMENDATION PRESENTATION PROGRAM

(71) Applicant: HONDA MOTOR CO., LTD., Tokyo (JP)

(72) Inventors: Hisashi Murayama, Wako (JP); Yuki Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 283 days.

(21) Appl. No.: 17/201,606

(22) Filed: Mar. 15, 2021

(65) Prior Publication Data
US 2021/0291840 A1    Sep. 23, 2021

(30) Foreign Application Priority Data
Mar. 19, 2020   (JP) .................. 2020-049648

(51) Int. Cl.
*B60W 40/08* (2012.01)
*B60W 50/14* (2020.01)
*G06N 3/08* (2023.01)

(52) U.S. Cl.
CPC ............ *B60W 40/08* (2013.01); *B60W 50/14* (2013.01); *G06N 3/08* (2013.01);
(Continued)

(58) Field of Classification Search
CPC .................. B60W 40/08; B60W 50/14; B60W 2050/146; B60W 2540/043;
(Continued)

(56) References Cited

U.S. PATENT DOCUMENTS 9,639,804 B1 *   5/2017   Palmer ..................... B60C 9/00
11,572,085 B2 *  2/2023   Oba ....................... B60W 50/14
(Continued)

FOREIGN PATENT DOCUMENTS

| JP | 2018-156249 A | 10/2018 |
| JP | 2018-190290 A | 11/2018 |
| JP | 2018-200192 A | 12/2018 |

*Primary Examiner* — Peter D Nolan
*Assistant Examiner* — Tanya C Sienko
(74) *Attorney, Agent, or Firm* — Rankin, Hill & Clark LLP

(57) ABSTRACT

A recommendation presenting system is provided, which includes: a personal authentication unit for identifying a driver who drives a host vehicle; a live body information detection unit configured to detect the driver's live body information; a determining unit for using a notification model, which is to specify information about an action advised, from the live body information, to the driver who is each driver authenticated by the personal authentication unit to determine information about an action in response to the live body information detected by the live body information detection unit; a notifier unit for notifying the driver about notification details including the information about the action determined by the determining unit; an action detection unit for detecting an action outcome of the driver who has received the notification details; and a learning unit for training the notification model by using the action outcome to update the notification model.

5 Claims, 3 Drawing Sheets

(52) U.S. Cl.
CPC . *B60W 2050/146* (2013.01); *B60W 2540/043* (2020.02); *B60W 2540/22* (2013.01); *B60W 2540/221* (2020.02); *B60W 2540/227* (2020.02)

(58) Field of Classification Search
CPC ....... B60W 2540/22; B60W 2540/221; B60W 2540/227; G06N 3/08
See application file for complete search history.

(56) References Cited

U.S. PATENT DOCUMENTS

| | | | |
|---|---|---|---|
| 2017/0210288 A1* | 7/2017 | Briggs | B60W 50/16 |
| 2017/0355377 A1* | 12/2017 | Vijaya Kumar | B60W 50/0098 |
| 2018/0093672 A1* | 4/2018 | Terwilliger | G08B 21/06 |
| 2018/0330804 A1 | 11/2018 | Hiruta et al. | |
| 2018/0342005 A1 | 11/2018 | Yuhara et al. | |
| 2019/0080532 A1* | 3/2019 | Lee | G07C 9/00571 |
| 2020/0062274 A1* | 2/2020 | Kowal | G07C 5/008 |
| 2020/0150667 A1* | 5/2020 | Rakshit | A61B 5/747 |
| 2020/0209850 A1* | 7/2020 | Abu Elreich | H04W 4/40 |
| 2021/0001810 A1* | 1/2021 | Rivard | B60R 25/25 |
| 2021/0107501 A1* | 4/2021 | Monteil | A61B 5/6893 |
| 2021/0155268 A1* | 5/2021 | Oba | G06F 1/163 |
| 2022/0034678 A1* | 2/2022 | Chintakindi | B60W 60/0051 |

* cited by examiner

RECOMMENDATION PRESENTING SYSTEM, RECOMMENDATION PRESENTING METHOD, AND RECOMMENDATION PRESENTATION PROGRAM

CROSS REFERENCE TO RELATED APPLICATION

This application claims the foreign priority benefit under Title 35, United States Code, § 119(a)-(d) of Japanese Patent Application No. 2020-049648, filed on Mar. 19, 2020 in the Japan Patent Office, the disclosure of which is herein incorporated by reference in its entirety.

TECHNICAL FIELD

The present invention relates to a recommendation presenting system, a recommendation presenting method, and a recommendation presentation program.

BACKGROUND ART

The physical condition of a vehicle-driving driver critically affects the quality of driving, and thus needs careful management. A driver's self-report on the physical condition is subjective. Then, a system for objectively measuring the physical condition of a driver by using a sensor has been disclosed.

Japanese Patent Application Publication No. 2018-200192 describes a method for recommending a place that causes a change in the emotion of a user using a device.

Japanese Patent Application Publication No. 2018-190290 describes a passenger health management system including a measuring unit configured to measure health condition of a passenger onboard to acquire biometric information and a proposal determining unit configured to determine, based on the biometric information, a proposal to be presented to the passenger, the proposal determining unit configured to prepare the proposal including a proposal advising medical examination at a medical facility and a proposal advising purchase of medicine at a shop that sells medicine.

Japanese Patent Application Publication No. 2018-156249 describes a stress mitigation support device configured to predict a stress level of a driver of a vehicle on the basis of congestion sign information and a secular change of the congestion sign information and instruct performance of a rest guidance by a display device in response to a stress level.

SUMMARY OF INVENTION

Technical Problem

A driver's physical condition changes every minute. Even though the drive is in a good health state 10 min before, the state may abruptly change into a poor state such as a drowsy, fatigue, incontinent, or acute poor physical condition. In addition, on a highway, for instance, it is often difficult to take a rest soon during traveling. Thus, a system for recommending (proposing) a rest before a change in the physical condition has been sought.

Meanwhile, too frequent rest recommendations are problematic. For instance, in view of highway bus operation information, there are usually fixed stop times and locations. If a rest is taken more than necessary, a delay in operation occurs. Thus, an increase in accuracy is important to present an appropriate number of recommendations at appropriate timings.

Accordingly, it is necessary to provide a recommendation fit for the individual driver's body habits in view of the driver's personal differences. For instance, it is preferable to recommend a driver A, who is resistant to drowsiness but has a frequent desire to urinate, to rest and go to toilet frequently in a short period of time. By contrast, it is preferable to recommend a driver B, who is vulnerable to drowsiness but has a less frequent desire to urinate, to rest and take a long nap less frequently. Unfortunately, the conventional technologies of the above Patent Literatures fail to provide a system for presenting a recommendation about details appropriate for the driver in view of the personal differences.

Here, the present invention addresses the problem of providing an appropriate recommendation about a rest during driving in view of a driver's personal differences.

Solution to Problem

A recommendation presenting system of the invention includes the following features.

An aspect of the invention provides a recommendation presenting system comprising:
  a personal authentication unit configured to identify a driver who drives a host vehicle;
  a live body information detection unit configured to detect the driver's live body information;
  a memory unit configured to store a notification model for specifying information about an action advised, from the live body information, to the driver who is each driver authenticated by the personal authentication unit;
  a determining unit configured to determine, based on the notification model read from the memory unit, the information about the action in response to the live body information detected by the live body information detection unit;
  a notifier unit configured to notify the driver about notification details including the information about the action determined by the determining unit;
  an action detection unit configured to detect an action outcome of the driver who has received the notification details; and
  a learning unit configured to train the notification model by using the action outcome to update the notification model.

Advantageous Effects of Invention

The invention makes it possible to provide an appropriate recommendation about a rest during driving in view of a driver's personal differences.

DESCRIPTION OF EMBODIMENTS

Hereinafter, an embodiment of the invention is described with reference to the Drawings.

Figure 1:
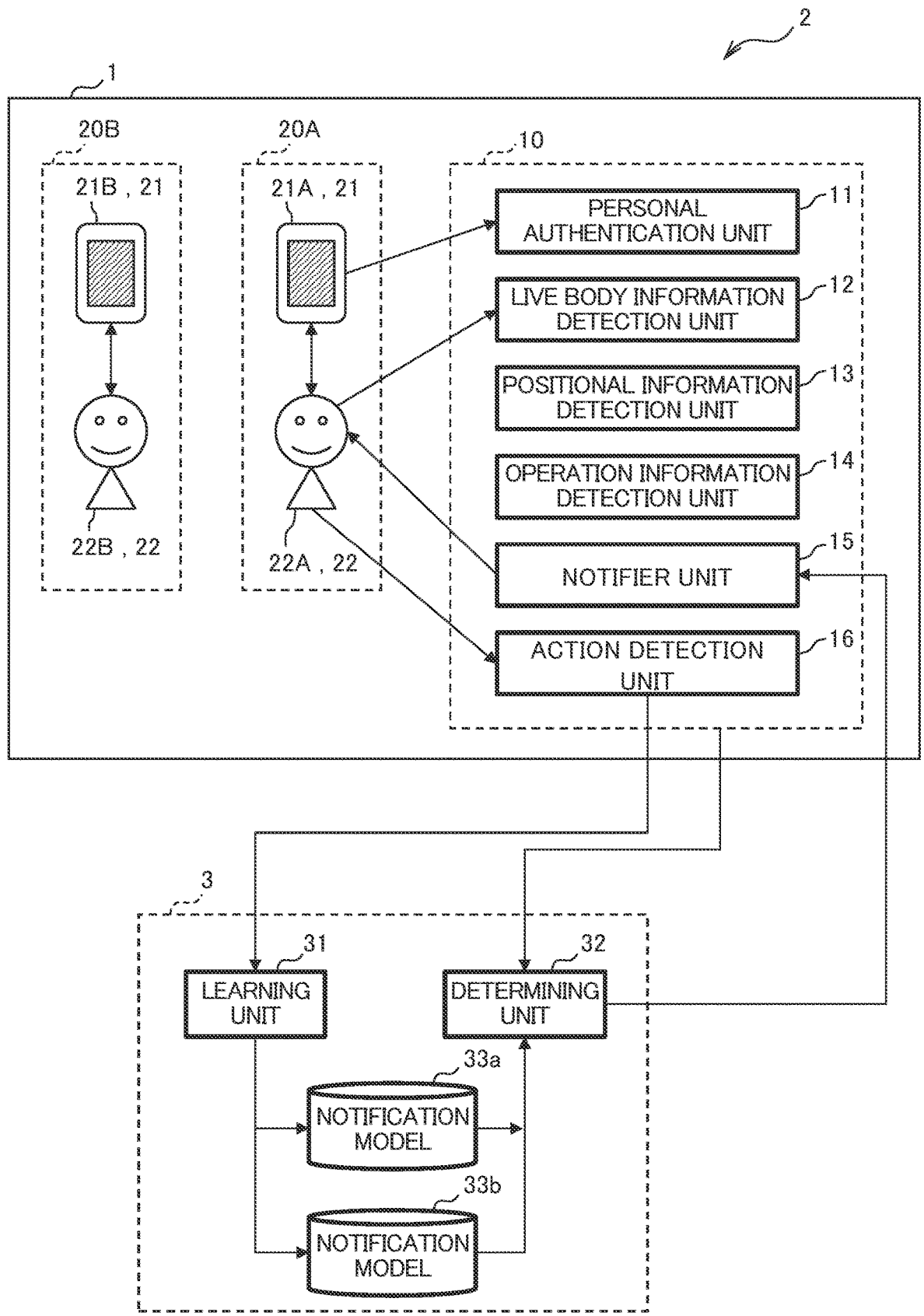
FIG. 1 is a diagram showing how to configure a recommendation presenting system according to an embodiment of the invention.

FIG. 1 is a diagram showing the configuration of a recommendation presenting system 2.

This recommendation presenting system (a recommendation presenting device) 2 is configured such that an in-vehicle device 10 in a host vehicle (a vehicle: a personal vehicle, a company car, etc.) 1 may be connected via a network (cloud) to a proposal device 3 outside the host vehicle 1 or via cables, etc. in the host vehicle 1. Further, the in-vehicle device 10 and the proposal device 3 may be housed in the same housing.

Meanwhile, a user 22A, who is a driver, sits on a driver seat 20A in the host vehicle 1, and a user 22B, who is a passenger, sits on a passenger seat 20B. Further, as a user terminal 21 such as a smartphone, a user terminal 21A used by the user 22A and a user terminal 21B used by the user 22B are brought into the host vehicle 1.

The in-vehicle device 10, the user terminal 21, and the proposal device 3 are each configured as a computer including a central processing unit (CPU), a memory means (memory unit) (e.g., a memory, a hard disk), and a network interface.

This computer lets the CPU execute a program (also called as an application, in short, App) stored on a memory to operate a control unit (control means) including each processing unit.

The in-vehicle device 10 includes a personal authentication unit 11, a live body information detection unit 12, a positional information detection unit 13, an operation information detection unit 14, a notifier unit 15, and an action detection unit 16.

The personal authentication unit 11 is configured to authenticate (identify, as an individual) a driver (the user 22A in FIG. 1) who sits on the driver seat 20A. This authentication processing is specifically realized as a procedure exemplified below.

(1) Capture a face image of the user 22A who currently sits on the driver seat 20A to authenticate the face image.
(2) Search for the user terminal 21A that can be in short-range wireless communication from the driver seat 20A and receive identification information on the user 22A from the user terminal 21A.
(3) Let the personal authentication unit 11 read a use permission from a car-sharing member card the user 22A has if the use permission of the host vehicle 1 is temporarily issued, as a car-sharing service, to the user 22A.

Figure 2:
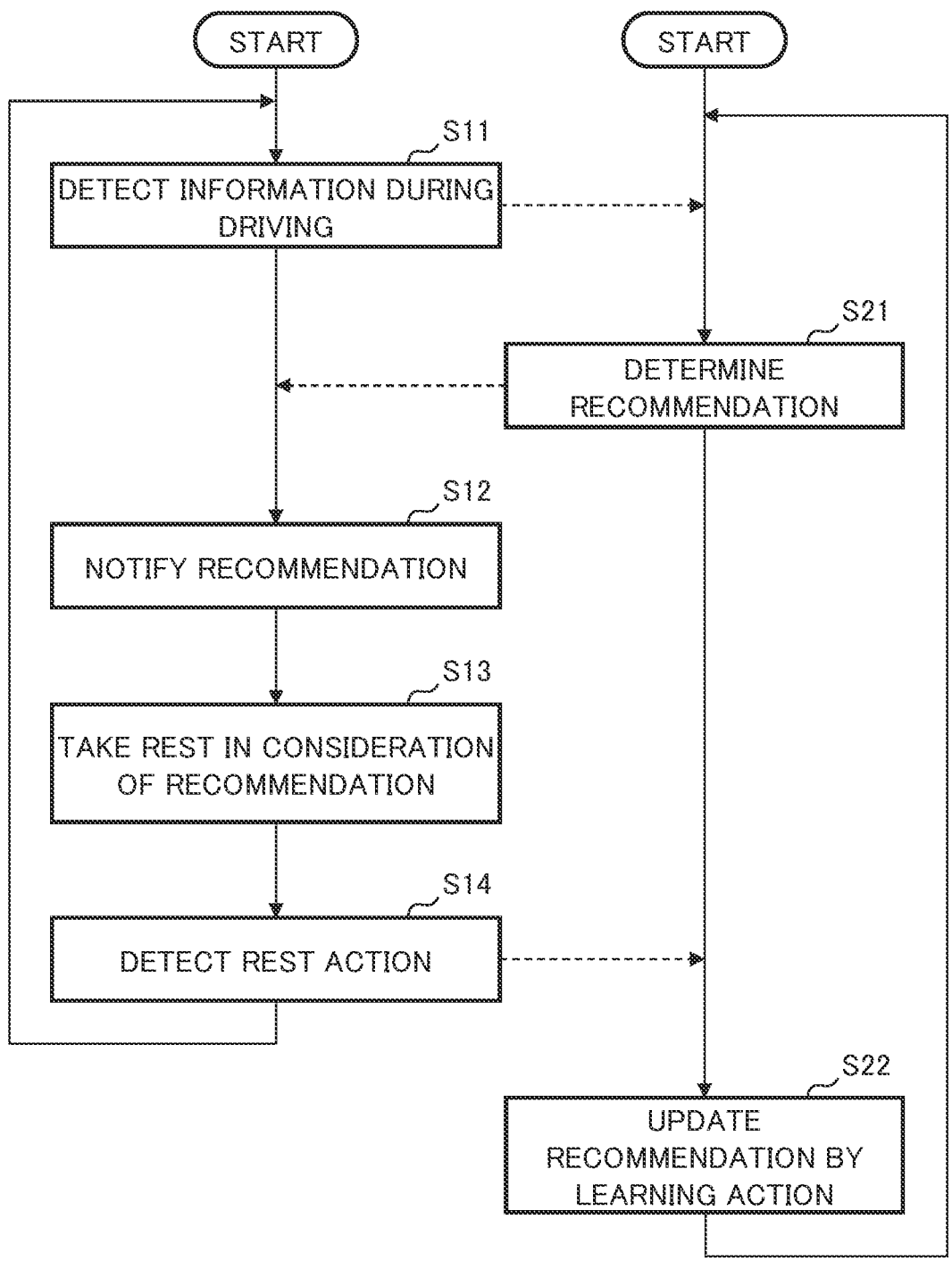
FIG. 2 is a flowchart illustrating processing of the recommendation presenting system according to this embodiment.

FIG. 2 is a flowchart illustrating processing of the recommendation presenting system 2.

Various detection units (the live body information detection unit 12, the positional information detection unit 13, and the operation information detection unit 14) are configured to detect information during driving so as to determine details of recommendation fit for the current situation (S11).

Figure 3:
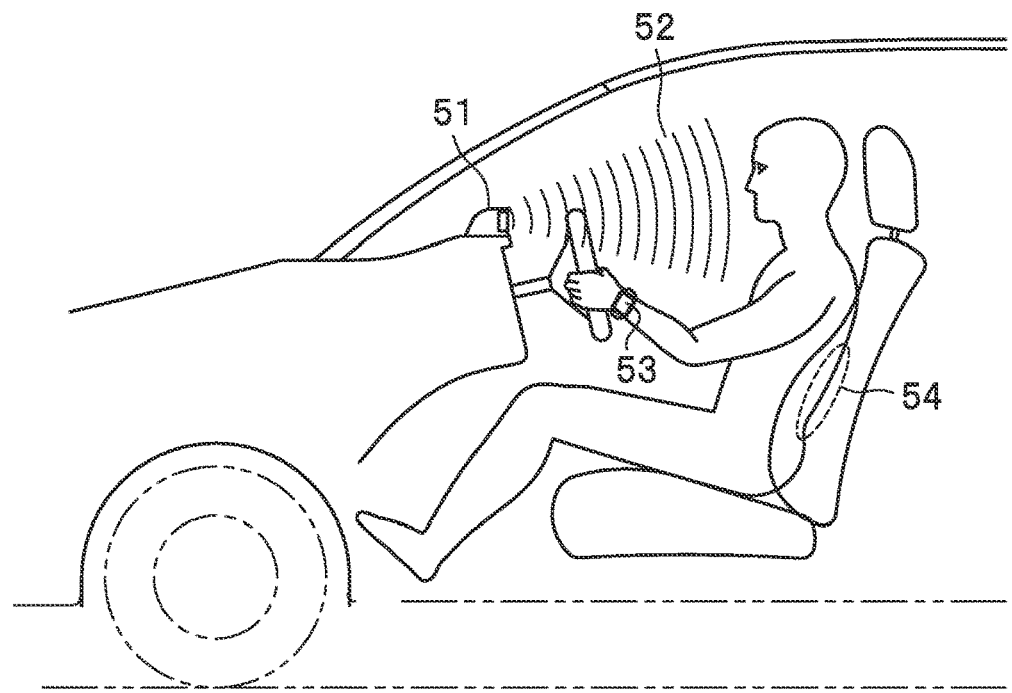
FIG. 3 is a side view showing various sensors used by a live body information detection unit in an embodiment of the invention.

FIG. 3 is a side view showing various sensors used by the live body information detection unit 12.

The live body information detection unit 12 is configured to detect live body information about the driver on the basis of data measured with a camera 51, a smartwatch 53, and a seat sensor 54.

The camera 51 can monitor the driver while the image capture range 52 is at or near the driver's face. The face image captured by the camera 51 may be used to measure the orientation of face and an eye blink. In addition, the camera 51 device may be functioned as thermography to measure, without contact, the body temperature from a thermogram of the face image.

The smartwatch 53 is a wearable device worn around an arm of the driver and is configured to directly measure live body information such as the body temperature, the blood pressure, the pulse rate, and the electrocardiogram of the driver.

The seat sensor 54 is configured to measure live body information such as the body temperature, the pulse rate, and the sweating of the driver who sits.

The description of S11 in FIG. 2 continues.

The positional information detection unit 13 is configured to detect positional information about the host vehicle 1 (the position of the host vehicle) by referring to Controller Area Network (CAN) data and Global Positioning System (GPS) data for in-vehicle control and to reflect the detected host vehicle position in notification details.

For instance, there may be just one parking area, where one can rest and go to toilet, ahead of the currently traveling highway. In this case, although the user 22A does not have an urgent desire to urinate, the notification details prepared are like "This parking area ahead is the only opportunity to rest and go to toilet. So, please take a rest earlier". In this way, the positional relationship (distance) between the position of the host vehicle and a rest facility such as a service area or parking area is reflected in the notification details.

The operation information detection unit 14 is configured to detect operation information such as the operation continuation period, the vehicle stops, the vehicle departure, and the speed of the host vehicle 1 by referring to control data from the Electronic Control Unit (ECU) of the host vehicle 1 and reflect the detected operation information in the notification details. For instance, the vehicle may stop for 1 h and the driving may then restart after 5 min. At this timepoint, the driver should have taken a sufficient rest, so that no recommendation to rest and go to toilet is issued.

Collectively, the information detected in S11 through the various detection units (the live body information detection unit 12, the positional information detection unit 13, and the operation information detection unit 14) are informed provided to the proposal device 3.

The proposal device 3, as shown in FIG. 1, includes a learning unit 31, a determining unit 32, and memory units for notification models 33a and 33b. The notification model 33a is a model personalized for the user 22A and the notification model 33b is a model personalized for the user 22B. The following describes an operation when the user 22A is a driver, so that the notification model 33a is used. However, when the user 22B is a driver, the notification model 33b is used.

In the learning unit 31, machine learning is performed to construct the notification model 33a (at S22; the details are described later).

The determining unit 32 is configured to give the corresponding recommendation output data as a determined result while the information, during driving, detected at S11 is set to data input into the notification model 33a personalized for the current driver (here, the user 22A) who has been authenticated by the personal authentication unit 11 (S21). This recommendation is issued from the proposal device 3 to the in-vehicle device 10.

Note that the notification model 33a is constructed as a deep-learning multilayer neural network and performs inference while, for instance, the information, during driving, detected at S11 (one or more pieces of sensor information) is input into an input layer, the physical condition such as the drowsy, incontinent, and/or deteriorated physical condition of the user 22A is used for an intermediate layer(s), and a rest action (e.g., a nap within 30 min, a rest to go to toilet) fit for the inference result is output from an output layer.

That is, recommendations (e.g., a rest, a destination change) fit for the prediction of a change in the physical condition of each driver in view of the personal differences are registered in the notification model 33a or 33b.

Figure 4:
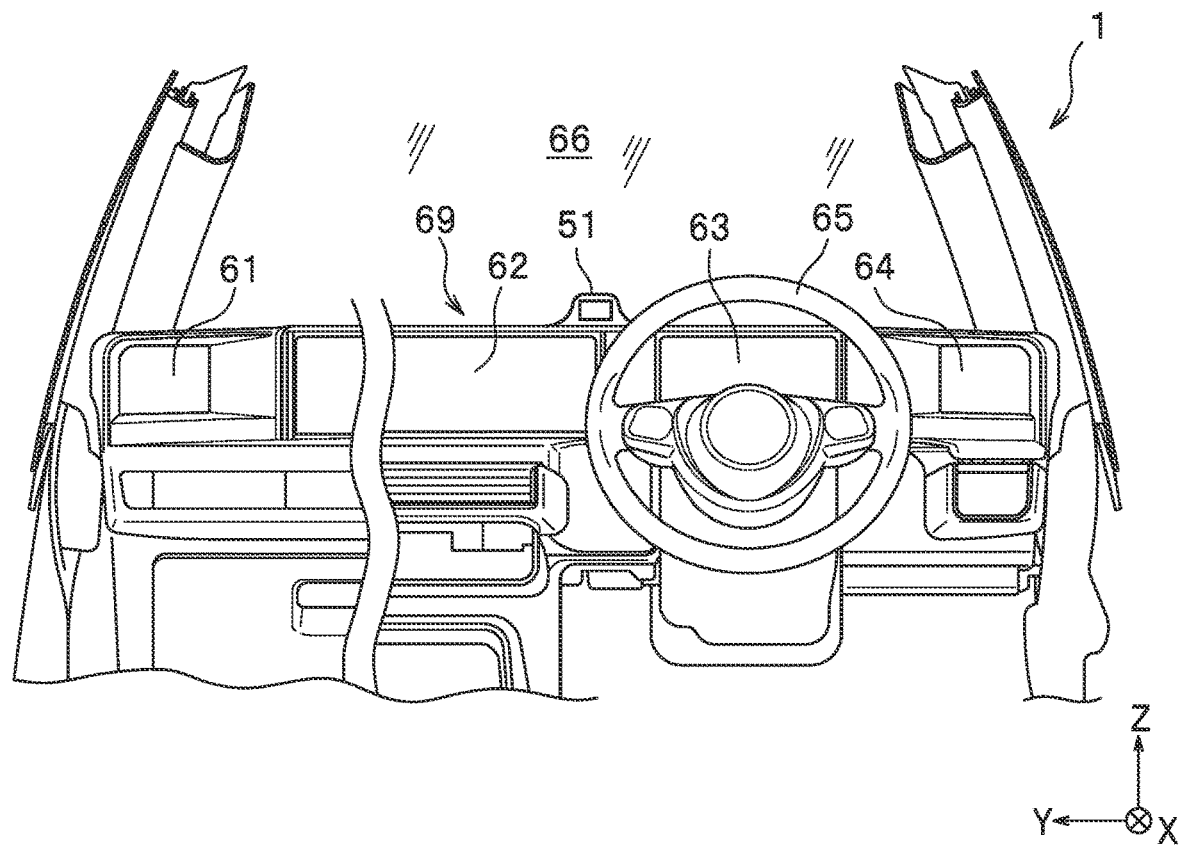
FIG. 4 is a configuration diagram showing the structure of a cabin front section of a host vehicle involving an embodiment of the invention.

The notifier unit 15 is configured to notify the user 22A, during driving, about the recommendation issued on the basis of the processing at S21, thereby urging the user 22A to take a rest action fit in view of the personal differences (S12). With reference to FIG. 4, the following specifically describes a device for notifying the user 22A about a recommendation by screen display or audio in the host vehicle 1.

FIG. 4 is a configuration diagram showing the structure of a cabin front section of the host vehicle 1.

Touch panels 61 to 64 of the host vehicle 1 are display devices with a function to display, on display screen, various information to an occupant(s) in the cabin, and is doubled as an input device configured to output, to the ECU, information about a touch position detected when the touch position is detected on the display screen.

The touch panels 61 to 64 are not particularly limited, and for instance, may have, as a component, a Liquid Crystal Display (LCD) or an Electroluminescence (EL) display. The display devices such as the touch panels 61 to 64 may be configured using a Head Up Display (HUD) that projects a given image on a windshield 66.

An appropriate number of speakers that output a recommendation like "Please take in water" by audio are provided at suitable positions of, for instance, an instrument panel 69, a door panel, and a rear parcel shelf (not shown) in the cabin.

The instrument panel 69 has the following (1) to (4) touch panels 61 to 64. Note that the touch panels 61 to 64 may be additionally provided at positions facing the rear seats (on the back surface side of the front seat).

(1) The left-side panel 61 provided on the passenger seat 20B side in the vehicle width direction. The left-side panel 61 is configured to display information about the left-side rear and lower images of the host vehicle 1 as captured by a side camera installed on the left side of the host vehicle 1.

(2) The multi-information panel 62 that is provided facing the driver seat 20A and the passenger seat 20B and is wide in the vehicle width direction. The multi-information panel 62 is configured to display, for instance, various information such as information on a map at or near the host vehicle 1, information on the current position of the host vehicle 1 on the map, traffic information (including signal information) about the currently traveling road or a scheduled route for the host vehicle 1, traffic participant information about traffic participants present in the surrounding of the host vehicle 1 (including pedestrians, bicycles, motorcycles, other vehicles, or the like), and messages issued to the traffic participants.

Further, the multi-information panel 62 is configured to display a recommendation including a message such as "Why don't you take a nap at service area×2 km ahead?" and a map to show a route to the service area X.

(3) The meter panel 63 provided at a position directly facing, via the steering wheel 65, the driver seat. The meter panel 63 is configured to display, for instance, a speed meter, a tachometer, an odometer, shift position information, and information about the lighting state of lights and so on.

(4) The right-side panel 64 provided on the driver seat 20A side in the vehicle width direction. The right-side panel 64 is configured to display information about the right-side rear and lower images of the host vehicle 1 as captured by a side camera installed on the right side of the host vehicle 1.

Note that instead of using the information output/input devices (touch panels 61 to 64 and speakers) mounted on the host vehicle 1, a device(s) (e.g., the user terminal 21) physically separated from the host vehicle 1 may be used. That is, output screen signals displayed on the touch panels 61 to 64 inside the vehicle may be output, via wireless communication such as Bluetooth (registered trademark), to the user terminal 21.

Back to FIG. 2. The user 22A may or may not take a rest action in consideration of a recommendation (S13). The reason why the recommendation is unaccepted involves, for instance, the case where the notification model 33a for the user 22A is still at the initial stage of machine learning and is not yet sufficiently trained.

The action detection unit 16 is configured to detect a rest action (or no rest action) at S13 by using various detection units (the live body information detection unit 12, the positional information detection unit 13, and the operation information detection unit 14) (S14). The action detection unit 16 informs the proposal device 3 of information about the detected action of the driver.

The learning unit 31 is configured to receive the information about the action of the driver as informed at S14 and then perform machine learning to update the details of recommendation in the notification model 33a (S22). For instance, the recommendation notified at S12 may be "Please take a rest within an hour", but the information about the action of the user 22A involves a rest after an hour and a half. In this case, the learning unit 31 recognizes that the user 22A is a person who is resistant to fatigue. Then, the notification model 33a is trained to make a rest interval longer the next time. That is, the learning unit 31 subjects the notification model 33a, which has incorrect output data "a rest within an hour", to back-propagation with correct output data "a rest after an hour and a half".

By contrast, when the same recommendation "Please take a rest within an hour" is given, the user 22B may take a rest after 30 min. In this case, the learning unit 31 recognizes that the user 22B is a person who is vulnerable to fatigue. Then, the notification model 33b is trained to make a rest interval shorter the next time.

In this way, the notification model 33a is trained with the action outcome different from the recommendation, and is then updated to a recommendation fit for the habit of the user 22A the next time (S21).

In the above-described embodiment, the action detection unit 16 detects an action of the driver after the recommendation, and the learning unit 31 reflects the action in the notification model 33a. This makes it possible to provide an appropriate recommendation about a rest during driving in view of the driver's personal differences.

REFERENCE SIGNS LIST

1 Host vehicle
2 Recommendation presenting system

3 Proposal device (Recommendation presenting system)
10 In-vehicle device (Recommendation presenting system)
11 Personal authentication unit
12 Live body information detection unit
13 Positional information detection unit
14 Operation information detection unit
15 Notifier unit
16 Action detection unit
20A Driver seat
20B Passenger seat
21 User terminal
22 User
31 Learning unit
32 Determining unit
33a Notification model (Memory unit)
51 Camera
52 Image capture range
53 Smartwatch
54 Seat sensor
61 Left-side panel
62 Multi-information panel
63 Meter panel
64 Right-side panel
65 Steering wheel
66 Windshield
69 Instrument panel

The invention claimed is:

1. A recommendation presenting system comprising:
a personal authentication unit configured to identify a driver who drives a personal vehicle;
a live body information detection unit configured to detect the driver's live body information;
a memory unit configured to store a notification model for specifying information about an action advised from the live body information to the driver who is each driver authenticated by the personal authentication unit;
a determining unit configured to determine, based on the notification model read from the memory unit, the information about the action in response to the live body information detected by the live body information detection unit;
an operation information detection unit configured to detect operation information including an operation continuation period and a stopping period about the personal vehicle;
a rest determination unit configured to determine that the driver has taken a rest when the personal vehicle restarts after stopping for a predetermined period with reference to the operation information;
a notifier unit configured to notify the driver about notification details including the information about the action determined by the determining unit when the rest determination unit did not determine that the driver has taken the rest;
an action detection unit configured to detect an action outcome of the driver who has received the notification details; and
a learning unit configured to train the notification model by using the action outcome to update the notification model.

2. The recommendation presenting system according to claim 1, wherein the live body information detection unit is configured to detect the live body information from a wearable device worn by the driver.

3. The recommendation presenting system according to claim 1, wherein the personal authentication unit is configured to acquire, from a user terminal possessed by the driver, identification information to identify the driver.

4. A method of presenting a recommendation by using a recommendation presenting system including a personal authentication unit, a live body information detection unit, a memory unit, a determining unit, an operation information detection unit, a rest determination unit, a notifier unit, an action detection unit, and a learning unit, the method comprising:
identifying a driver who drives a personal vehicle by the personal authentication unit;
detecting live body information about the driver by the live body information detection unit;
storing, in the memory unit, a notification model for specifying information about an action advised from the live body information to the driver who is each driver authenticated by the personal authentication unit;
causing the determining unit to determine, based on the notification model read from the memory unit, the information about the action in response to the live body information detected by the live body information detection unit;
detecting operation information including an operation continuation period and a stopping period about the personal vehicle by the operation information detection unit;
determining that the driver has taken a rest when the personal vehicle restarts after stopping for a predetermined period with reference to the operation information by the rest determination unit;
notifying, by the notifier unit, the driver about notification details including the information about the action determined by the determining unit when the rest determination unit determines that the driver has not taken the rest;
causing the action detection unit to detect an action outcome of the driver who has received the notification details; and
training, in the learning unit, the notification model by using the action outcome to update the notification model.

5. A recommendation presenting system comprising:
a personal authentication unit configured to identify a driver who drives a personal vehicle;
a live body information detection unit configured to detect the driver's live body information;
a memory unit configured to store a notification model for specifying information about an action advised from the live body information to the driver who is each driver authenticated by the personal authentication unit;
a determining unit configured to determine, based on the notification model read from the memory unit, the information about the action in response to the live body information detected by the live body information detection unit;
a positional information detection unit configured to detect positional information about the personal vehicle;
a facility determination unit configured to determine, based on the positional information and a destination of the personal vehicle, whether or not a predetermined facility exists within a predetermined distance in a travelling direction of the personal vehicle;

a notifier unit configured to notify, regardless of the driver's live body information, the driver about notification details including the information about the action determined by the determining unit, when the predetermined facility does not exist within the predetermined distance;

an action detection unit configured to detect an action outcome of the driver who has received the notification details; and a learning unit configured to train the notification model by using the action outcome to update the notification model.

\* \* \* \* \*